H. HOVLAND.
PARTY LINE TELEPHONE SYSTEM.
APPLICATION FILED AUG. 6, 1917.
Reissued Feb. 5, 1918.
14,430.
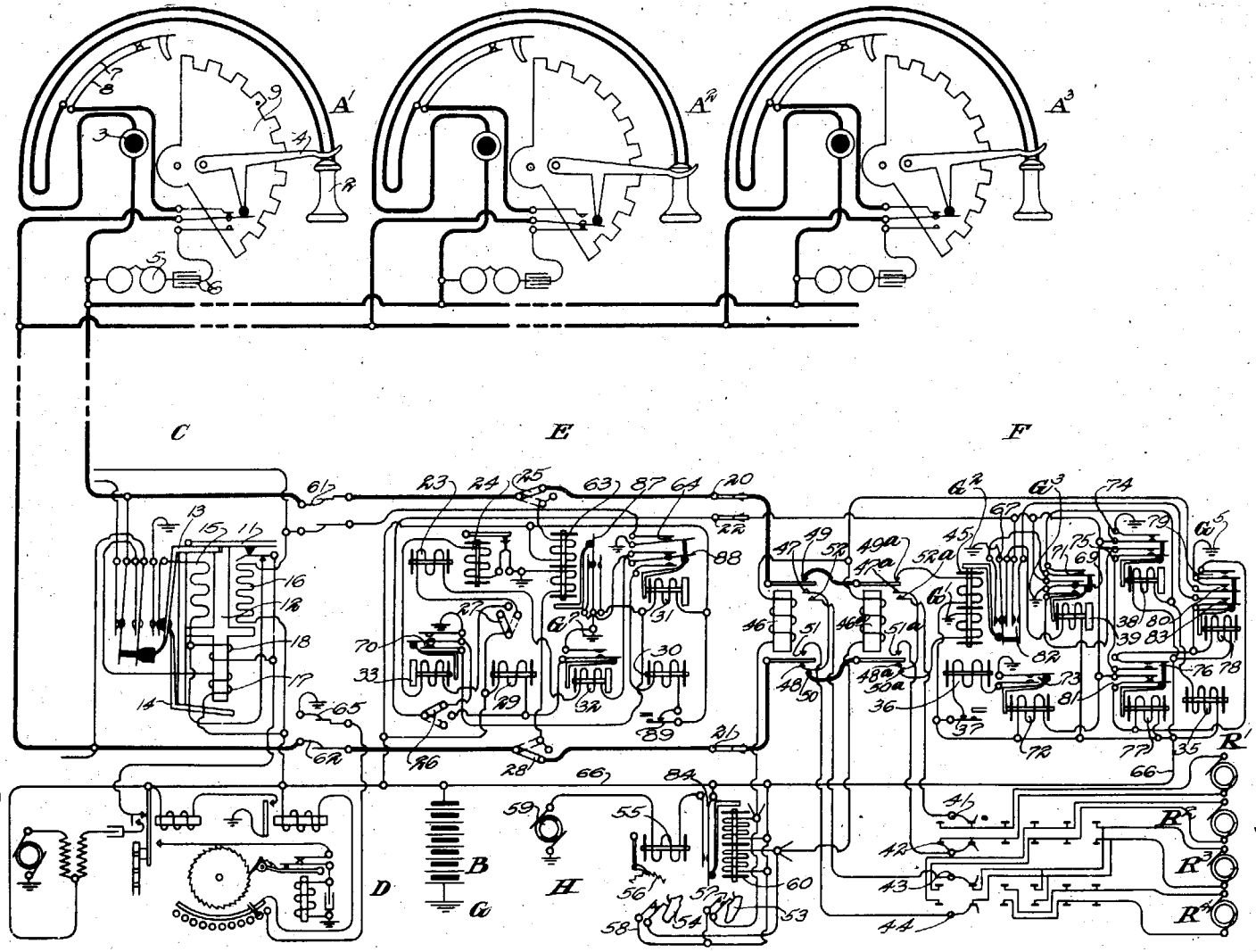
Inventor
Henry Hovland.
E. D. Fales.
Attorney

UNITED STATES PATENT OFFICE.

HENRY HOVLAND, OF EAST ORANGE, NEW JERSEY, ASSIGNOR TO AUTOMATIC ELECTRIC COMPANY, OF CHICAGO, ILLINOIS, A CORPORATION OF ILLINOIS.

PARTY-LINE TELEPHONE SYSTEM.

14,430. Specification of Reissued Letters Patent. Reissued Feb. 5, 1918.

Original No. 1,158,221, dated October 26, 1915, Serial No. 728,811, filed October 31, 1912. Application for reissue filed August 6, 1917. Serial No. 184,756.

*To all whom it may concern:*

Be it known that I, HENRY HOVLAND, of East Orange, in the county of Essex and State of New Jersey, have invented certain new and useful Improvements in Party-Line Telephone Systems, of which the following is a specification.

My invention relates to party-line telephone systems, and more specifically to an improved mechanism whereby, when the call is from one subscriber to another on the same line, the calling subscriber may signal the desired called subscriber. A call of this character is oftentimes referred to as a reverting call, and by my invention I provide a ring-back device which may be selectively operated by the calling subscriber so as to select any two of a plurality of ringing generators. One of these generators is of a character such as will ring the bell at the called subscriber's station, while the other generator selected is of a character to ring the bell at the station of the calling subscriber. Upon making the call the calling subscriber automatically operates this ring-back device to select the desired pair of ringing generators, and then replaces his receiver upon the switch hook. The ring-back device then automatically starts to operate to alternately throw ringing current of the two selected frequencies upon the line, thus alternately sounding the bells at the calling and called subscriber's stations. Upon the response of the called subscriber the ringing current is disconnected from the line, and thus the calling subscriber is advised by the cessation of the ringing of his bell that the called subscriber has answered. He then again removes his receiver from the hook and the conversation is carried on in the usual manner.

A further object of my invention is the improved manner in which the release of the ring-back device and the automatic switches employed in establishing the connection is brought about. As I have above pointed out, when the calling subscriber first replaces his receiver upon the hook and thus opens the line circuit, the ring-back device is automatically started in operation. When, however, after the called subscriber has responded and the bridge is again removed from across the line by the hanging up of the receivers at both the calling and called subscriber's stations, the ring-back device is released.

These and other objects of my invention will be more readily understood by reference to the accompanying drawings, in which I have chosen to illustrate my invention in connection with an automatic system of the type in which the connection between subscribers' lines is established through the medium of subscribers' individual or line switches, selectors and connectors. Such a system being well known in the art, it is not thought necessary to describe the entire system herein, and I have accordingly shown only a sufficient portion thereof to illustrate fully the mode of operation of my invention.

In the accompanying drawing I have shown diagrammatically a single polystation subscriber's line, together with its individual switch C at the central office, a master switch D, a selector switch E and my improved ring-back device F. At B there is shown a battery for furnishing current for operating the central office apparatus and for talking purposes. Connected to the subscriber's line there are three substations $A^1$, $A^2$ and $A^3$. These substations may be of any suitable or approved type. Referring to the substation $A^1$, each of the substations shown herein comprises the usual receiver 2, transmitter 3, switch hook 4, ringer 5 and condenser 6. Being an automatic substation it is also provided with an impulse transmitter or calling device which is represented herein by a pair of impulse springs 7 and 8 and a toothed impulse wheel 9, which latter is assumed to be controlled through the medium of a finger hole dial (not shown) in such a manner that the impulse springs 7 and 8 may be momentarily separated a number of times corresponding to each digit of the number to the called.

The line switch C, which is individual to the line, is of the general type of line switches shown in British patent to R. W. James No. 26,301 of 1906, being of the particular form shown in British patent to T. G. Martin No. 1419 of 1910. This line switch, as is well known, comprises a plunger (not shown) which is secured to a so-called plunger arm 11, which latter, when attracted by the magnet 12, causes said plunger to be thrust into one of a plurality of groups of contact springs, each of which groups represents the terminal of a trunk line leading to a selector switch E. The line switch also comprises a cut-off relay armature 13 and a line relay armature 14, and its magnet 12 comprises four windings, namely, a pull-down winding 15, a holding and cut-off winding 16, a line winding 17 and an auxiliary winding 18. The line switch C is one of a group of similar switches which are all controlled by a common mechanism or master switch D in such a manner that the plungers of all the idle switches are always maintained opposite the terminal of an idle trunk line. The master switch D is of the type of master switches disclosed in said British Patents Nos. 26,301 of 1906 and 1419 of 1910.

The selector E is of the general type of selector switches disclosed in United States Letters Patent No. 815,321, granted March 13, 1906, to Keith, Erickson and Erickson, being modified, however, as shown in said British Patent No. 1419 of 1910, in order to operate in a two-wire system. In general, this switch comprises a bank of contacts arranged in rows or levels and which are adapted to be engaged by a set of wipers 20, 21 and 22 which are carried by a vertically and rotatably movable shaft (not shown), the movements of which are controlled by the so-called vertical and rotary magnets 23 and 24. The usual side switch comprising the wipers 25, 26, 27 and 28 is controlled by the private magnet 29 in the well-known manner. The usual release magnet is represented at 30. The relays 31 and 32 and 33 are slow acting relays—that is, relays which deënergize slowly after their energizing circuits have been broken.

The ring-back device F comprises among other details two pairs of wipers 41 and 42, and 43 and 44, which are carried upon a rotary shaft and adapted to be advanced step by step over two double rows of contacts through the medium of a stepping magnet 35. The magnet 36 is a release magnet which, when energized, withdraws a holding pawl from the shaft of the switch and allows the wipers to be restored to normal position by a spring in a well-known manner. The contact 37, which is included in the circuit of the release magnet, is controlled by the shaft of the switch so as to be closed only when said shaft is rotated one or more steps from its normal position. The operation of the switch is controlled by the calling subscriber through the medium of a double-wound line relay 45. The relays 38 and 39 are relays which deënergize slowly. There are provided in the switch F two ringing relays 46 and 46ª. The apparatus as shown herein is adapted to be used in connection with a four-party line system. There are therefore shown four ringing current generators $R^1$, $R^2$, $R^3$ and $R^4$, which are assumed to produce ringing current of four different characters. The ringers 5 of the different substations on the subscriber's line may be arranged in any well-known manner to respond only to the ringing current generated by some particular one of the generators. For instance, the generator $R^1$ may produce ringing current of the proper character to operate the ringer at the substation $A^1$. The generator $R^2$ may operate the ringer at the substation $A^2$; the generator $R^3$ may operate the ringer at the substation $A^3$ and the generator $R^4$ may operate the ringer at the fourth substation $A^4$ (not shown). The generator $R^1$ is connected with the first three contacts in the upper double row of contacts of the switch F. The generator $R^2$ is connected to the fourth and fifth contacts of the upper row and to the first contacts of the lower row. The generator $R^3$ is connected to the sixth contacts of the upper row and to the second and fourth contacts of the lower row. The generator $R^4$ is connected to the third, fifth and sixth contacts of the lower row. With this arrangement, it will be seen that the wipers 41, 42, 43 and 44 may be set so as to connect any two of the generators desired with the springs of the ringing relays 46 and 46ª. Beneath the selector switch E there is shown an interrupter device H which may be common to a plurality of frequency selectors F. This device comprises a pair of interrupter wheels 53 and 54 which are driven by means of a motor magnet 55 and ratchet wheel 56. During their rotation the wheels 53 and 54 alternately close the contacts 57 and 58. At 59 there is shown a continuously operating interrupter for producing impulses for operating the magnet 55. The operation of the device H is controlled through the medium of a double-wound relay 60.

A general description of the apparatus having been given, it will now be explained how one of the subscribers on the party-line may signal another subscriber on the same line. Since the operations of the line switch C and the selector E shown herein are in general well known in the art, and are fully described in the publication hereinabove referred to, it is not thought necessary to give a detailed description of the same herein. In general, the operation of these switches is as follows: Upon the removal of the receiver from the switch-hook at any of the substations on the line, a bridge is closed across the line through the talking circuit at said substation, whereby an energizing circuit is closed through the line winding 17 of the switch C. The winding 17, upon energizing, attracts the armature 14, whereby a circuit is closed through the pull-down winding 15, which latter operates to attract the cut-off armature 13 and the plunger arm 11. This latter operation causes the calling line to be extended through the line switch bank contacts 61 and 62 to the selector E, whereupon its line relay 63 becomes energized and closes the circuit of the relay 31. The closure of the contact 64 by the energization of the relay 31 completes a holding circuit for the holding winding 16 of the line switch C to maintain said switch in its operated position after the cut-off armature 13 has disconnected the line winding 17 from the line and allowed the armature 14 to fall back to open the circuit of the operating winding 15. The closure of the contact 65 upon the operation of the line switch C causes the master switch D to advance the plungers of the idle line switches of the group to which the switch C belongs to an idle trunk line. It is assumed herein that some level of the first selector is reserved for reverting call purposes. For this purpose there is connected to the contacts of this level a plurality of trunk lines, each of which leads to a ring-back device F. The calling subscriber, after having obtained connection with the selector E, by the removal of his receiver operates his calling device for the digit corresponding to the level of the selectors to which the ring-back devices are connected. This operation of the substation calling device produces a series of momentary interruptions in the circuit of the selector line relay 63. The operation of the relay 63, in response to these impulses, causes a series of impulses to be transmitted through the vertical magnet 23, whereby the wipers of the selector are raised to a position opposite the level to which the ring-back devices are connected, after which the private magnet 29 causes the side switch to pass to second position. The rotary magnet 24 is thereupon brought into play and operates in the usual manner to rotate the wipers onto an idle set of contacts in said level, after which the side switch passes to third position. Upon the engagement of the side switch wipers 25 and 28 of the selector with their third-position contact points, a circuit is closed through the line relay 45 of the ring-back device F. This circuit extends from ground $G^1$ through the lower winding of said relay, contacts $50^a$ and 50, selector wiper 21, side switch wiper 28, contact 62, thence over the line circuit to and through the calling substation and back over the other side of the line, through the line switch bank contact 61, side switch wiper 25, shaft wiper 20, contacts 49 and $49^a$ and the upper winding of the relay 45 to the battery lead 66, thence through the battery B to ground G. The relay 45, upon energizing, closes a circuit extending from ground $G^2$ through the front contact of the spring 67 and relay 39 to the battery lead 66. The relay 39, upon energizing, provides a guarding ground potential for the selector private bank contacts of the trunk line leading to the selector ring-back device and a holding circuit for the release relay 31 of the selector E. This circuit extends from ground $G^3$ through the front contact of the spring 69 to the private bank contacts of the selected trunk in all of the selector switches which have access thereto and through the wiper 22 of the selector E, side switch wiper 26, contact 70 and the relay 31 to the battery lead 66. The relay 39, upon energizing, also closes a circuit extending from ground $G^3$ through the front contact of the spring 69 and thence through the relay 72. The relay 72, upon energizing, opens the contact 73 in the circuit of the release magnet 36 to prevent the energization of said magnet when the contact 37 is closed upon the first step of the switch shaft. The calling subscriber must now cause the wipers of the ring-back device F to be advanced onto the pairs of contacts which are connected to the two ringing current generators which are adapted to produce ringing current of the proper frequency for operating the ringers at the calling and called substations. For instance: If the subscriber at the substation $A^1$ is calling the subscriber at the substation $A^2$, or vice versa, the wipers 41, 42, 43 and 44 must be advanced onto their first contacts, and therefore into engagement with the terminals of the generators $R^1$ and $R^2$. If the subscriber at the substation $A^1$ is calling the subscriber at the substation $A^3$, the wipers must be advanced onto the second contacts and into connection with the generators $R^1$ and $R^3$, etc. In order to advance these wipers to any desired point, the calling subscriber operates his calling device for a digit which is one less than the number of steps required for the wipers to reach the desired contacts, and then hangs up his receiver. For instance: It has been assumed herein that the subscriber at the substation $A^1$ is calling the subscriber at the substation $A^3$. The calling subscriber therefore operates his calling device for the digit 1, whereby the circuit of the line relay 45 is interrupted once momentarily. The relay 39 being a slow acting relay does not deënergize during the momentary interruption of its circuit by the deënergization of the relay 45, and therefore the relay 45, upon deënergizing transmits an impulse over a circuit extending from ground $G^2$ through the back contact of the spring 67, contact 71, stepping magnet 35 and the relay 38 in multiple to the battery lead 66. The operation of the relay 38 at this time is functionless. The magnet 35 operates in response to this impulse to advance the wipers 41, 42, 43 and 44 onto the first contacts in their respective rows. The calling subscriber now replaces his receiver upon the switch-hook, whereby the circuit of the line relay 45 of the ring-back device F is again broken. The relay 45, upon deënergizing, again closes the circuit of the stepping magnet 35, whereby the wipers 41, 42, 43 and 44 are advanced one more step onto the second contacts in their respective rows. The relay 45, in its deënergized position, also breaks the circuit of the relay 39, which in turn deënergizes after a short time. After the relay 39 deënergizes, the holding circuits for the relay 72 and for the release relay 31 of the selector are maintained at the contact 74 of the relay 38, which is energized by the deënergization of the line relay. The circuit of the relay 38, as well as that of the stepping magnet 35, is, of course, broken at the contact 71 when the relay 39 deënergizes; but since the relay 38 is a slow acting relay, it maintains the contact 74 closed until another holding circuit for the relays 72 and 31 can be closed in the following manner: Since the relay 38 is energized when the relay 39 deënergizes, a circuit is closed extending from ground $G^3$ through the back contact of the spring 69, contact 75 of the relay 38 and normally closed contact 76 of the relay 77, thence through the relay 78 to the battery lead 66. The relay 78, upon energizing, closes a locking circuit for itself and also one for the relay 77. The circuit for the relay 77 extends from ground $G^5$ through the contact 79 and relay 77 to the battery lead 66. The locking circuit for the relay 78 extends from ground $G^5$ through the contact 79, contact 81 of the relay 77, contact 82 of the relay 45 and thence through the contact 83 and the winding of the relay 78 to the battery lead 66. In this circuit last traced it will be seen that there is also a circuit extending from ground $G^5$ through the contacts 79 and 81 to the circuits of the relays 72 and 31 to maintain them energized after the relay 38 has fallen back and permitted the contact 74 to be opened. A further result of the energization of the relay 78 is the closure of a circuit extending from ground $G^5$ through the contact 80, and thence through the windings of the two ringing relays 46 and $46^a$ and through the two windings of the relay 60 to the battery lead 66. The windings of the relay 60 have a comparatively high resistance and do not permit sufficient current to flow through the ringing relays 46 and $46^a$ to cause them to be operatively energized. The relay 60, however, is energized and by closing the contact 84 completes the circuit of the stepping magnet 55. The magnet 55 thereupon begins to rotate the ratchet wheel 56 and interrupter wheels 54 and 53, whereby the contacts 57 and 58 are alternately closed. Upon the closure of the contact 57 the upper winding of the relay 60 is short-circuited and the ringing relay 46 is operatively energized. In the relay 46 the contacts 47 and 48 are preferably in the nature of follow-up contacts, so that as the relay is energized the contacts are made and broken in the following sequence: First, the contacts 49 and 50 are broken simultaneously, then the contact 47 is closed, then the contact 48 is broken and finally the contacts 51 and 52 are closed simultaneously. As the relay deënergizes, the contacts are made and broken in the reverse order—that is, the contacts 51 and 52 are broken simultaneously, then the contact 48 is closed, then the contact 47 is closed and finally the contacts 50 and 49 are closed simultaneously. The relay $46^a$ operates in the same manner. Upon energizing, the relay 46 therefore first disconnects the line relay of the ring-back device F from the line by the opening of the contacts 49 and 50. The closure of the contact 47 then short-circuits the line, which, however, is without function at this time. The contact 48 is next opened and this short-circuit broken, then the contacts 52 and 51 are closed, whereby the ringing current generator $R^3$ is connected with the calling line by way of the wipers 43 and 44. The calling line is therefore supplied with ringing current from the ringing current generator $R^3$, which, as before explained, is of the proper character to operate only the ringer at the called-for station $A^3$. After the interrupter wheels have advanced far enough to open the contact 57, the ringing relay 46 deënergizes, with the result that after the generator $R^3$ is disconnected from the line, the line is then short-circuited during the time the contacts 47 and 48 are both closed and then the short-circuit is removed from the line and the connection between the line and the line relay of the ring-back device is restored. The object in short-circuiting the line after the ringing current is disconnected therefrom, and before the connection with the relay 45 is restored, is to provide a path for the discharge of the condensers on the calling line, so that they will not cause a momentary energization of the relay 45. After the ringing relay 46 is deënergized, the contact 58 is closed by the interrupter and the ringing relay $46^a$ is energized to connect the ringing current generator $R^1$ with the calling line. This generator $R^1$ furnishes ringing current of the proper character for operating the ringer at the calling substation $A^1$. The relays 46 and $46^a$ will continue to be alternately energized and deënergized to alternately ring the bells at the calling and called substations $A^1$ and $A^3$ until the called subscriber responds by removing his receiver from the switch hook. As soon as this occurs, or as soon thereafter as the ringing relay deënergizes, if it happens to be energized at the time, the line relay 45 again becomes energized and by opening the contact 82 destroys the holding circuit of the relay 78. The relay 77, however, remains energized over a circuit extending from ground $G^3$ through the front contact of the spring 69 of the relay 39, which latter is again energized upon the energization of the relay 45, and through the contact 81 and the winding of the relay 77 to the battery lead 66. The relay 78, upon deënergizing, permanently breaks the circuits of the ringing relays 46 and $46^a$ to prevent further application of ringing current to the line. The calling subscriber's bell therefore ceases to ring, which is an indication to him that the called subscriber has answered, and he removes his receiver again and the two subscribers now carry on an uninterrupted conversation, the talking current being supplied through the windings of the line relay 45 over the heavy conductors shown in the drawing.

The release of the central office apparatus is brought about by the hanging up of the receivers at both the calling and the called substations. When the last receiver is hung up the line relay 45 again deënergizes. Since the relay 77 is locked up at this time, no circuit is closed through the relay 78 by the deënergization of the relay 45, and consequently as soon as the relays 38 and 39 deënergize, the circuit of the relay 38 being closed by the falling back of the relay 45, as heretofore explained, the circuits of the relays 72 and 31 are broken. The relay 72, upon deënergizing, closes the circuit of the release magnet 36 at the contact 73, whereupon said magnet energizes and permits the wipers 41, 42, 43 and 44 to be restored to their normal positions, whereupon the contact 37 is opened and the magnet 36 permitted to deënergize. The deënergization of the relay 31 at the selector E completes a circuit extending from ground $G^7$ through the back contact of this spring 87, back contact of the spring 88, magnet 30 and the contact 89 to the battery lead 66. The magnet 30, upon energizing permits the shaft of the selector to be restored to normal position, whereupon the contact 89 is opened and the magnet 30 permitted to deënergize. The relay 31, upon deënergizing, also opens the circuit of the holding winding 16 of the line switch C at the contact 64 and the line switch is permitted to release also.

It will thus be seen that I have devised a very efficient mechanism for making reverting calls. The calling subscriber has merely to operate his dial to properly operate the ring-back device in order to select the two desired ringing generators, and then, upon replacing his receiver upon the hook, his bell is sounded to advise him of the fact that the called subscriber is being signaled, and the cessation of this signal advises him of the fact that the called subscriber has answered. I believe that I am the first one to devise a system in which two kinds of ringing current are sent back over the calling line in order to operate the calling signal at both the calling and the called subscriber's stations. Likewise, I believe that I am the first to devise a system in which the opening of the bridge across the calling line at one time is operative to start the ringing operation, and at another time is operative to cause the release of the connection.

While I have chosen to illustrate my invention in connection with one particular embodiment of the same, it is, of course, to be understood that I do not wish to be limited to the exact construction shown and described.

What I claim as my invention is:—

1. In a telephone system, a party-line, a ring-back apparatus for enabling one party to call another on the same line, means for connecting said line with said apparatus, a plurality of sources of ringing current of different characters, and means controlled by said ring-back apparatus for selecting two of said sources to operate the signals at the calling and called substations.

2. In a telephone system, a party line, a ring-back apparatus for enabling one party to call another on the same line, means for connecting said line with said apparatus, a plurality of ringing generators for supplying ringing current of different characters, means controlled by the calling subscriber for operating said apparatus to select any two of said generators, and means for then alternately transmitting the current from said two selected generators over said line.

3. In a telephone system, a party-line, a plurality of ringing generators for supplying ringing current of different characters, a step-by-step apparatus for selecting any two of said generators, and means for alternately supplying current from said selected generators to said line.

4. In a telephone system, a party-line, a plurality of ringing generators for supplying ringing current of different characters, a step-by-step ring-back apparatus, means for connecting said line with said apparatus, means controlled by the calling subscriber for operating said ring-back apparatus to select any two of said ringing generators, and means for then alternately connecting said selected ringing generators with the line.

5. In a telephone system, a party-line, a ring-back apparatus for enabling one party to call another on the same line, and means controlled by said ring-back apparatus for transmitting two kinds of ringing current back over said line to operate the calling signal at both the calling and called substations on said line.

6. In a telephone system, a party-line, a ring-back apparatus for enabling one party to call another on the same line, a plurality of ringing current generators, said ring-back apparatus comprising a pair of wipers, means to operate said wipers to connect each of said wipers with any one of said ringing current generators, and means to alternately connect said wipers with said line.

7. In a telephone system, a party-line, a ring-back apparatus for enabling one party to call another on the same line, a plurality of ringing current generators, said ring-back apparatus comprising two pairs of wipers, means for connecting one of said pairs with any one of said ringing generators, means for connecting the other pair with any of the remaining generators, and means for then alternately connecting said pairs of wipers with said line.

8. In a telephone system, a party-line, a ring-back apparatus for enabling one party to call another on the same line, a plurality of ringing generators of different characteristics, said ring-back apparatus including a plurality of pairs of wipers, means controlled by the calling subscriber to connect one of said pairs of wipers with the ringing generator of a characteristic corresponding to the signal at the calling substation and for connecting the other pair of wipers with the ringing generator of a characteristic corresponding to the called substation, and means for then alternately connecting said pairs of wipers with said line.

9. In a telephone system, a party-line, a ring-back apparatus for enabling one party to call another on the same line, means including a selector switch for extending a connection from said line to said ring-back apparatus, a plurality of sources of ringing current, means controlled by said ring-back apparatus for selecting any two of said sources, and means controlled by the replacing of the calling subscriber's receiver upon the switch-hook for alternately transmitting current from said two selected generators over said line.

10. In a telephone system, a party-line, a ring-back apparatus for enabling one party to call another on the same line, a bridge across said line, means for opening said bridge to cause said ring-back apparatus to operate to send ringing current on the line while the bridge is open and means for opening said bridge at another time to cause the release of said apparatus.

11. In a telephone system, a party-line, a ring-back apparatus for enabling one party to call another on the same line, means including a selector switch for extending a connection from said line to said ring-back apparatus, a bridge on said line controlled by the switch-hook at the calling substation, means controlled by said ring-back apparatus for transmitting ringing current over said line to signal the called subscriber, means controlled by the opening of said bridge before the called subscriber has answered for starting said ring-back apparatus in operation to send ringing current on the line while the bridge is open and means controlled by the opening of said bridge after the called subscriber has answered for controlling the release of said connection.

12. In a telephone system, a party-line, a ring-back apparatus for enabling one party to call another on the same line, a plurality of sources of ringing current, means controlled by said ring-back apparatus for selecting two of said ringing generators of a character adapted to operate the signal at the calling and called substations on said line, a bridge on said line, means controlled by the opening of said bridge before the called subscriber has responded for operating said ring-back apparatus, and means controlled by the opening of said bridge after the called subscriber has responded for releasing said connection.

13. In a telephone system, a party-line, a ring-back apparatus for enabling one party to call another on the same line, means including a selector switch for extending a connection from said line to said ring-back apparatus, a bridge on said line controlled by the switch-hook at the calling substation, means controlled by said ring-back apparatus for transmitting ringing current over said line to signal the called subscriber, means controlled by the opening of said bridge at one point before the called subscriber has answered for starting said ring-back apparatus in operation to send ringing current on the line while the bridge is open, and means controlled by the opening of said bridge at the same point after the called subscriber has answered for controlling the release of said connection.

14. In a telephone system, a line, a second line, means for connecting said first and second lines, a plurality of signals operatively associated with said first line, an automatic switch for said second line, a signaling circuit for each signal under the control of said switch, means for supplying signaling current to said circuits and an impulse sender for operating said automatic switch over said second line, to apply signaling current to said first line, for operating both said signals while the first and second lines are connected.

15. In a telephone system, a line, a second line, a pair of signals for said first line, means for connecting the lines, a signaling circuit for each signal, means for supplying signaling current to said signaling circuits and automatic means for associating said signaling circuits with the connected circuit while the two lines are connected.

16. In a telephone system, a line, a second line, a pair of signals for said first line, means for connecting the lines, a signaling circuit for each signal, means for supplying signaling current to said signaling circuits, automatic means for associating said signaling circuits with the connected circuit while the two lines are connected and an impulse sender for controlling said automatic means over the second line for the purpose set forth.

17. In a telephone system, a line, a second line, a plurality of signals for said first line, means for connecting the two lines, a signaling circuit for each signal, means for supplying signaling current to said circuits and automatic means for selecting any two of said circuits and for associating the selected signaling circuits with the connected circuit while the said two line circuits are connected.

18. In a telephone system, a line, a second line, a plurality of signals for said first line, means for connecting the two lines, a signaling circuit for each signal, means for supplying signaling current to said circuits, automatic means for selecting any two of said circuits and for associating the selected signaling circuits with the connected circuit while the said two lines are connected, and an impulse sender for controlling said automatic means over the second line for the purpose set forth.

19. In a telephone system, a line, a second line, a pair of signals for said first line, means for connecting the lines, a signaling circuit for each signal, means for supplying signaling current to said signaling circuits, and automatic means for associating said signaling circuits with the connected circuit while the two lines are connected, said automatic means having equipment for controlling said signaling circuits for operating said signals while the first and second lines are connected.

20. In a telephone system, a line, a second line, a pair of signals for said first line, means for connecting the lines, a signaling circuit for each signal, means for supplying signaling current to said signaling circuits, automatic means for associating said signaling circuits with the connected circuit while the two lines are connected, and an impulse sender for controlling said automatic means over the second line for the purpose set forth, said automatic means having equipment for controlling said signaling circuits for operating said signals while the first and second lines are connected.

21. In a telephone system, a line, a second line, a pair of signals for said first line, means for connecting the lines, a signaling circuit for each signal, means for supplying signaling current to said signaling circuits, and automatic means for associating said signaling circuits with the connected circuit while the two lines are connected, said automatic means having equipment for controlling said signaling circuits for operating said signals alternately while the first and second lines are connected.

22. In a telephone system, a line, a second line, a pair of signals for said first line, means for connecting the lines, a signaling circuit for each signal, means for supplying signaling current to said signaling circuits, automatic means for associating said signaling circuits with the connected circuit while the two lines are connected, and an impulse sender for controlling said automatic means over the second line for the purpose set forth, said automatic means having equipment for controlling said signaling circuits for operating said signals alternately while the first and second lines are connected.

23 In a telephone system, a line, a second line, a plurality of signals for said first line, means for connecting the two lines, a signaling circuit for each signal, means for supplying signaling current to said circuit, and automatic means for selecting any two of said circuits and for associating the selected signaling circuits with the connected circuit while the said two lines are connected, said automatic means having equipment for controlling the selected signaling circuits for operating the corresponding signals.

24. In a telephone system, a line, a second line, a plurality of signals for said first line, means for connecting the two lines, a signaling circuit for each signal, means for supplying signaling current to said circuits, automatic means for selecting any two of said circuits and for associating the selected signaling circuits with the connected circuit while the said two lines are connected, and an impulse sender for controlling said automatic means over the second line for the purpose set forth, said automatic means having equipment for controlling the selected signaling circuits for operating the corresponding signals.

25. In a telephone system, a line, a second line, a plurality of signals for said first line, means for connecting the two lines, a signaling circuit for each signal, means for supplying signaling current to said circuits, and automatic means for selecting any two of said circuits and for associating the selected signaling circuits with the connected circuit while the said two lines are connected, said automatic means having equipment for controlling the selected signaling circuits for operating the corresponding signals alternately.

26. In a telephone system, a line, a second line, a plurality of signals for said first line, means for connecting the two lines, a signaling circuit for each signal, means for supplying signaling current to said circuits, automatic means for selecting any two of said circuits and for associating the electric signaling circuits with the connected circuit while the said two lines are connected, and an impulse sender for controlling said automatic means over the second line for the purpose set forth, said automatic means having equipment for controlling the selected signaling circuits for operating the corresponding signals alternately.

27. In a telephone system, a line, a second line, a plurality of signals for said first line, means for connecting the two lines, a signaling circuit for each signal, means for supplying signaling current to said circuits and automatic means for selecting a plurality of said signaling circuits and for associating the selected signaling circuits with the connected circuit while the said two lines are connected.

28. In a telephone system, a line, a second line, a plurality of signals for said first line, means for connecting the two lines, a signaling circuit for each signal, means for supplying signaling current to said circuits, and automatic means for selecting a plurality of said signaling circuits and for associating the selected signaling circuits with the connected circuit while the said two lines are connected, and an impulse sender for controlling said automatic means over the second line for the purpose set forth.

29. In a telephone system, a line, a second line, a plurality of signals for said first line, means for connecting the two lines, a signaling circuit for each signal, means for supplying signaling current to said circuits, and automatic means for selecting a plurality of said signaling circuits and for associating the selected signaling circuits with the connected circuit while the said two lines are connected, said automatic means having equipment for controlling said signaling circuits for operating said signals while the first and second lines are connected.

30. In a telephone system, a line, a second line, a plurality of signals for said first line, means for connecting the two lines, a signaling circuit for each signal, means for supplying signaling current to said circuits, and automatic means for selecting a plurality of said signaling circuits and for associating the selected signaling circuits with the connected circuit while the said two lines are connected, and an impulse sender for controlling said automatic means over the second line for the purpose set forth, said automatic means having equipment for controlling said signaling circuits for operating said signals alternately while the first and second lines are connected.

31. In a telephone system, a line, a second line, a plurality of signals for said first line, means for connecting the two lines, a signaling circuit for each signal, means for supplying signaling current to said circuits, and automatic means for selecting a plurality of said signaling circuits and for associating the selected signaling circuits with the connected circuit while the said two lines are connected, and an impulse sender for controlling said automatic means over the second line for the purpose set forth, said automatic means having equipment for controlling the selected signaling circuits for operating the corresponding signals.

32. In a telephone system, a line, a second line, a plurality of signals for said first line, means for connecting the two lines, a signaling circuit for each signal, means for supplying signaling current to said circuits, and automatic means for selecting a plurality of said signaling circuits and for associating the selected signaling circuits with the connected circuit while the said two lines are connected, and an impulse sender for controlling said automatic means over the second line for the purpose set forth, said automatic means having equipment for controlling the selected signaling circuits for operating the corresponding signals alternately.

33. In a telephone system, a party line, a trunk line, an automatic switch for connecting the two, a selective signaling mechanism, means controlled over the two sides of said line in series for connecting said trunk line with said mechanism and for initiating the operation thereof, and means effective during the signaling operation to maintain said switch in operated position independent of said party line.

34. In a telephone system, a line, a plurality of subscribers' stations in bridge of said line, a trunk line, an automatic switch for connecting the two, a selective signaling mechanism accessible to said trunk line, means controllable from one of said stations over the two sides of said line in series for operating said mechanism to signal another one of said stations, and means effective during said signaling operation for maintaining said switch in operated position independent of said first station.

35. In a telephone system, a plurality of subscribers' stations, each station having a signal responsive to a different kind of current, a line for said station, a trunk line, an automatic switch for connecting the two lines, sources of signaling currents of different kinds, means controllable from one of said stations over the two sides of said line in series for connecting said trunk line with any of said sources, and means effective during said connection for maintaining said switch in operated position independent of said stations.

36. In a telephone system, a line, a trunk line, a selective mechanism having a plurality of operating stages, automatic switching mechanisms for connecting said line with said mechanism via said trunk line, holding circuits for said switching mechanism, a battery for supplying current, means dependent upon direct current flow in said line for maintaining said holding circuits, and means effective during one of the operating stages of said mechanism for maintaining said holding circuits independent of current flow in said line.

37. In a telephone system, a line, a trunk line, a selective mechanism, automatic switching mechanisms for connecting said line with said mechanism via said trunk line, holding circuits for said switching mechanisms, a battery for supplying current, means dependent upon direct current flow in said line for maintaining said holding circuits, and means made effective in response to interruption of current flow in said line for temporarily maintaining said holding circuits.

38. In a telephone system, a line, a trunk line, a selective mechanism, automatic switching mechanisms for connecting said line with said mechanism via said trunk line, holding circuits for said switching mechanisms, a battery for supplying current, means dependent upon direct current flow in said line for maintaining said holding circuits, means made effective in response to interruption of current flow in said line for temporarily maintaining said holding circuits, and means actuated in response to renewed current flow in said line whereby said second means is prevented from responding to the next interruption of said current.

39. In a telephone system, a line, a trunk line, an automatic switch for connecting the two, a second automatic switch for said trunk line, other lines accessible to said second switch, a selective mechanism having a plurality of operating stages also accessible to said second switch, a battery for supplying current, restoring means for said switches normally responsive to prolonged interruption of current flow in said first line, and means whereby after a connection has been established from said first line to said mechanism said restoring means is made irresponsive to current interruption in said first line during one of said operating stages.

Signed by me at New York, New York county, New York, this 24th day of July, 1917.

HENRY HOVLAND